Sept. 12, 1961 G. J. THIESSEN ET AL 2,999,380
DENSIMETER
Filed Sept. 10, 1958 3 Sheets-Sheet 3

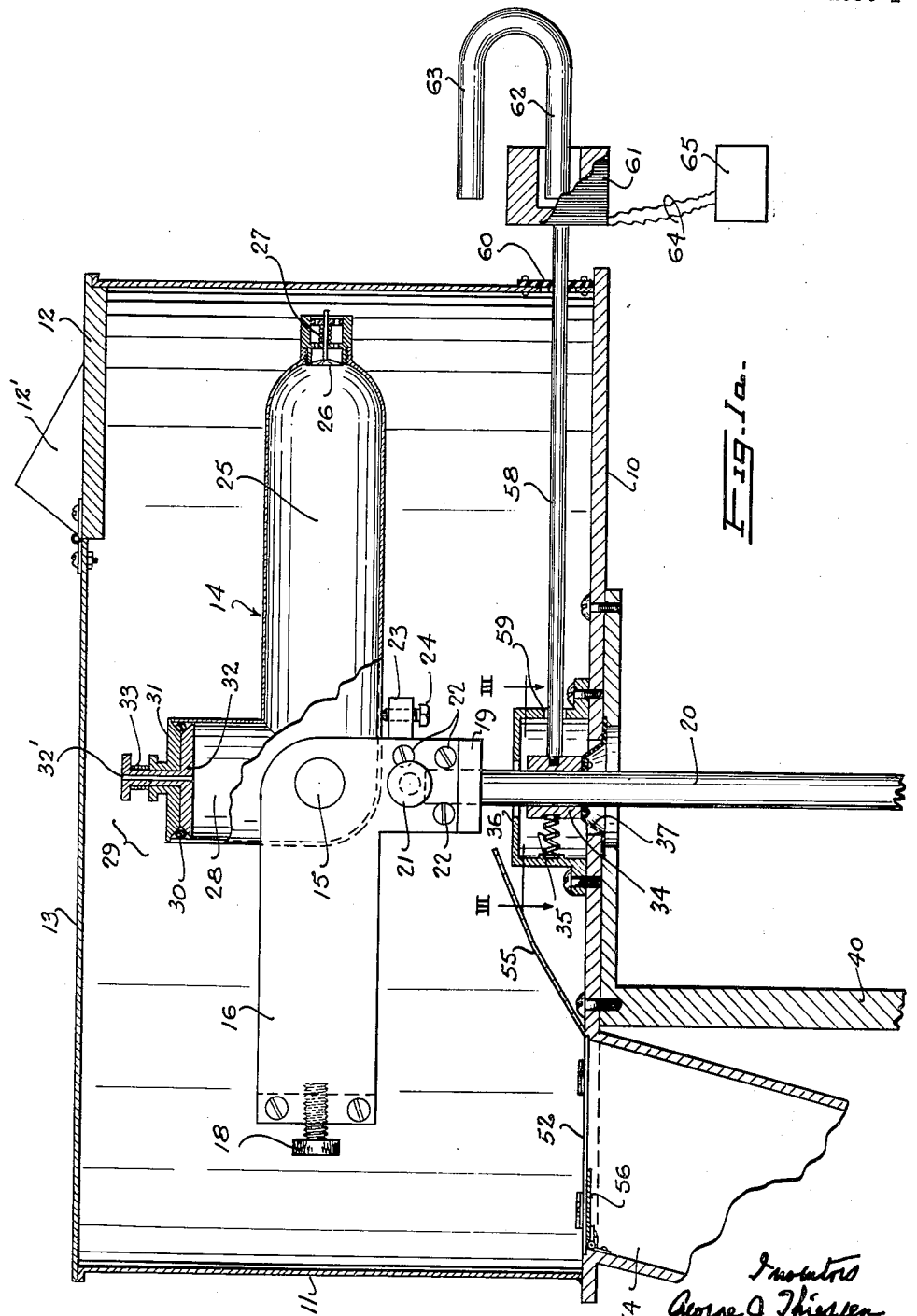

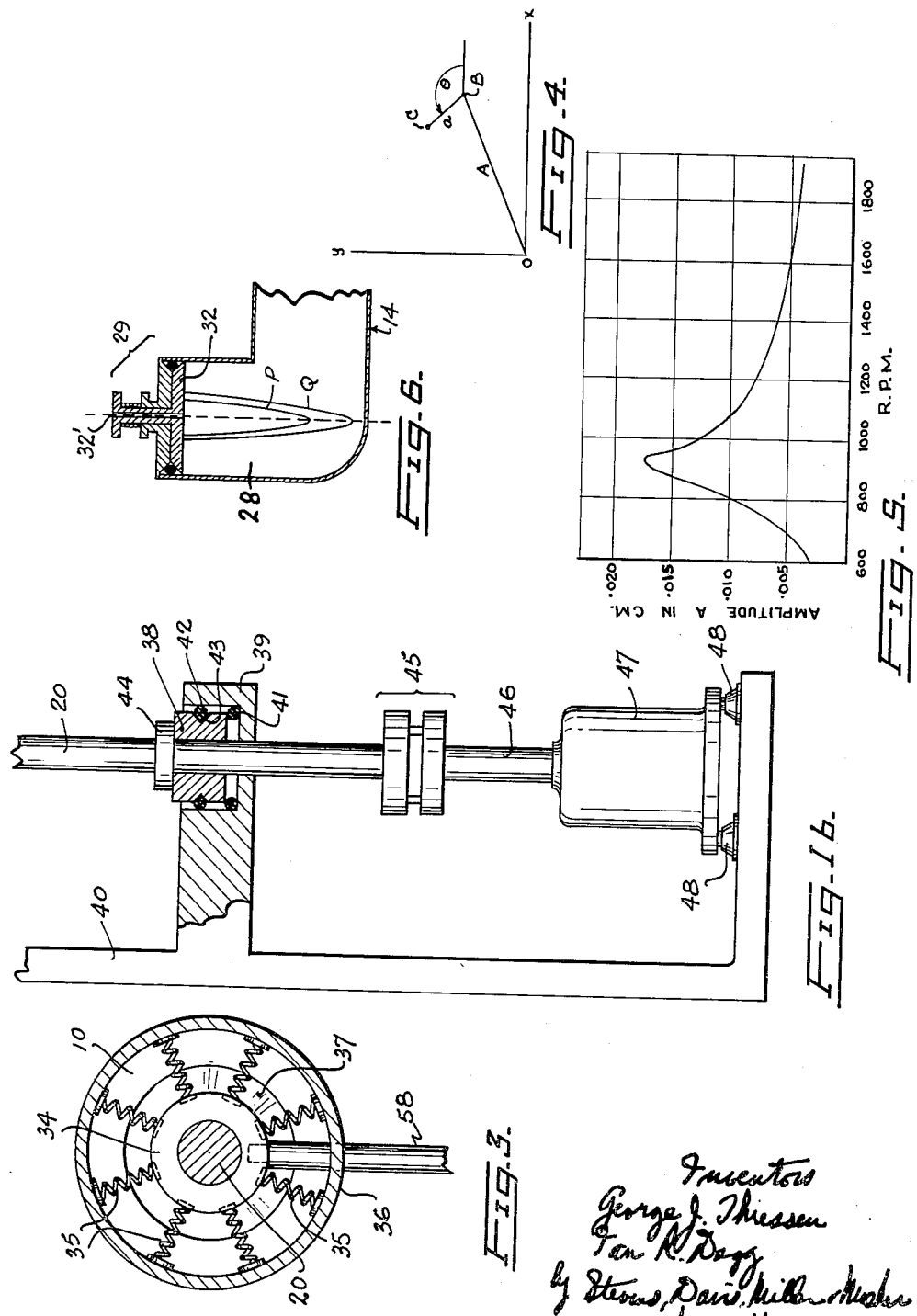

United States Patent Office 2,999,380
Patented Sept. 12, 1961

2,999,380
DENSIMETER
George J. Thiessen and Ian R. Dagg, Ottawa, Ontario, Canada, assignors to National Research Council, Ottawa, Ontario, Canada, a corporation of Canada
Filed Sept. 10, 1958, Ser. No. 760,244
Claims priority, application Canada July 29, 1958
7 Claims. (Cl. 73—32)

This invention relates to a densimeter, that is to say a device for measuring the density of a liquid sample.

The sample may be a homogeneous liquid such as oil, or may be inhomogeneous, consisting of a suspension of a solid in liquid, such as an aqueous suspension of paper pulp.

Oil and paper pulp suspensions have been cited as examples of liquids that the densimeter may be called upon to handle, because they are liquids in extensive industrial use the density of which is often required to be determined with a high degree of accuracy. Moreover, they are liquids the density of which should preferably be measurable under practical everyday operating conditions without special laboratory requirements.

The most common form of densimeter in use today is the hydrometer which is commonly used for measuring the density of battery acids, anti-freeze solutions and alcohol solutions. It consists essentially of a bulb with a thin stem attached to it, the bulb being weighted so that it always floats in the liquid with the stem uppermost. The extent to which the stem protrudes above the surface of the liquid is a measure of the density of the liquid. The hydrometer is a very convenient instrument and gives rapid readings, but has a very low accuracy.

Greater accuracy can be obtained by the laboratory technique of weighing a sample of known volume. This technique can be made very accurate if desired, but extreme care on the part of the technician is necessary if high accuracy is required. Moreover it is a comparatively slow method which is not well adapted to production plants or to automation.

The principal object of the present invention is to provide a densimeter that will combine the advantages of these prior art systems, while minimizing their disadvantages. The object may thus be stated as that of providing a densimeter of rugged and robust construction capable of being employed without the use of highly refined laboratory techniques, and preferably in conjunction with automatic manufacturing processes, but which will, at the same time, provide a measurement of high accuracy.

To illustrate the accuracy required in determining the density of a paper pulp suspension, for example, it may be stated that it is required in a paper mill to know the pulp content of a pulp suspension to within 2%, the density of pulp suspension in the headbox (at any given temperature) determining the weight per unit area of the final paper. The amount of pulp in suspension is only about 0.5% by weight of the liquid. The density of the pulp itself is only about 1.5, so that the density of the pulp suspension will be of the order of 1.002, that is, differing from that of pure water by approximately 0.2%. It follows that, since the pulp content requires to be known to an accuracy of 2%, the density of the suspension must be known to 0.004%, or four parts in one hundred thousand, if the density measurement is to be of any value in controlling the pulp content within the required limits.

The accuracy required in the oil industry is not normally quite as high as this. An accuracy of approximately 0.2%, that is two parts in a thousand is often required, however, and such accuracy is unobtainable with a hydrometer.

The invention contemplates a new method of determining density involving the measurement of the amount of out-of-balance imparted to a rotating system by a sample of the liquid under test, and in its broadest scope may be defined as a densimeter comprising an assembly including a vessel for containing a liquid sample; means for rotating said assembly about an axis of rotation, said vessel being asymmetrically disposed with respect to said axis; means resiliently mounting said assembly with freedom of oscillation transverse to said axis; and means for measuring the amplitude of any such oscillation.

The preferred embodiment of the invention consists of a densimeter comprising a temperature controlled enclosure; a vertically extending shaft entering said enclosure; an assembly of elements disposed within said enclosure and connected to said shaft to rotate therewith, said assembly comprising a closable vessel for containing a liquid sample and balancing means, said vessel having a first hollow portion substantially symmetrically surrounding the axis of rotation of said shaft and a second hollow portion communicating with said first portion and extending generally horizontally away from said first portion so as to be disposed asymmetrically with respect to said axis, said balancing means being so constructed and arranged as to compensate at least in part for such asymmetry whereby to control the position of the centre of gravity of said assembly as a whole and enable said centre of gravity to be made coincident with said axis; means mounting said shaft with freedom of oscillation transverse to said axis; and means for measuring the amplitude of any such oscillation.

An example of a densimeter device constructed according to the present invention is illustrated in the accompanying drawings in which:

FIGURE 1a is a partly sectioned elevation of the upper part of the device;

FIGURE 1b is a downward extension of FIGURE 1a, illustrating the lower part of the device;

FIGURE 3 is a section on the line III—III in FIGURE 1a;

FIGURE 4 is a diagram illustrating the operation of the device;

FIGURE 5 is a graph further illustrating such operation; and

FIGURE 6 is a diagrammatic fragmentary view of a portion of the apparatus shown in FIGURE 1a, also illustrating the operation.

Figure 2:
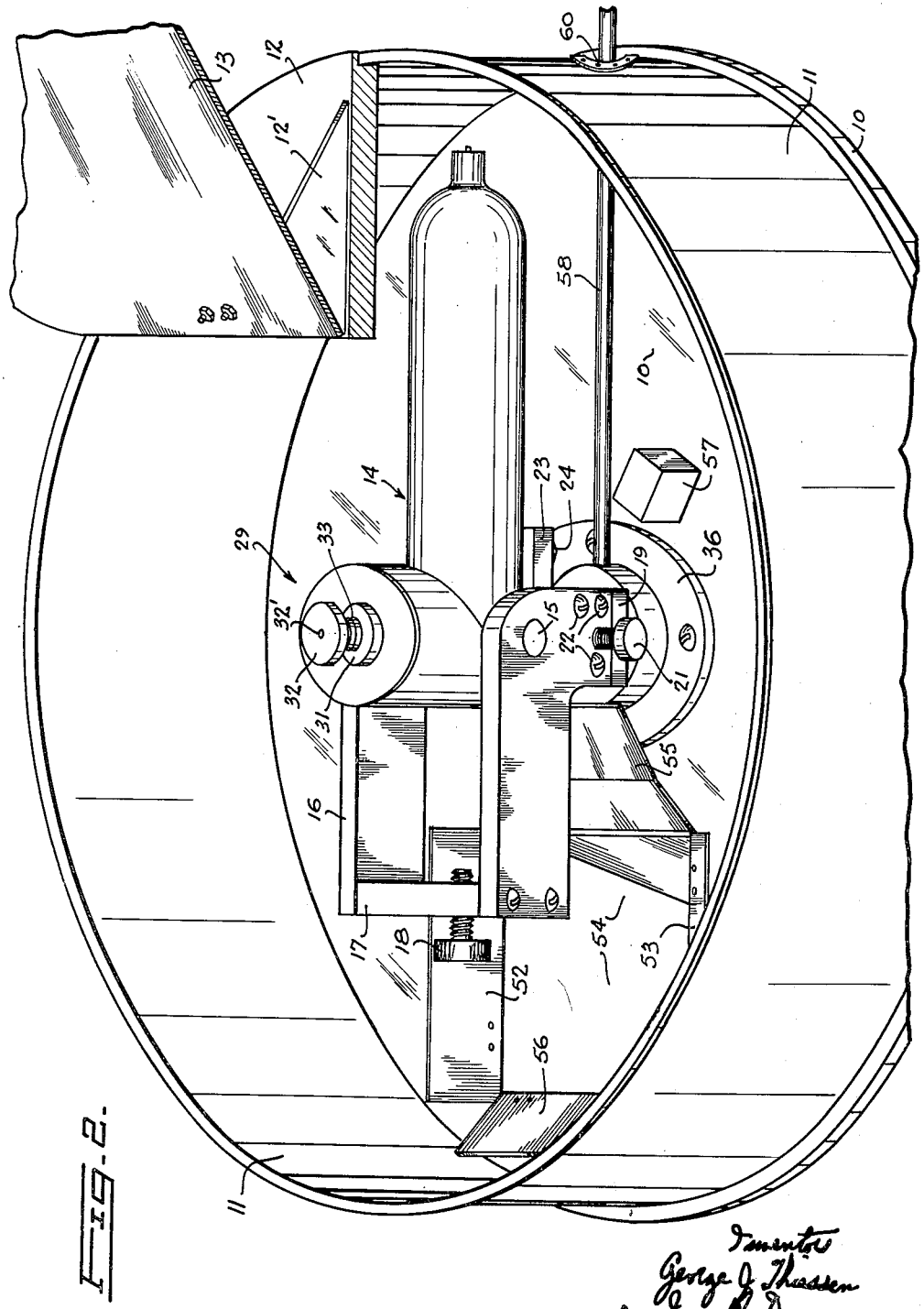
FIGURE 2 is a top perspective view of the device shown in FIGURE 1a with the upper cover raised.

The device comprises a base plate 10 (see initially FIGURES 1a and 2) upon which is mounted an enclosing cover for the apparatus, such cover comprising a cylindrical wall 11, fixed top segment 12 and a hinged top plate 13. Stops 12' limit opening of plate 13. The apparatus within the enclosure thus contained, comprises a sample containing vessel 14 mounted on trunnions 15 between a pair of spaced apart, parallel, bent plates 16, the remote ends of which are joined together by an interconnecting plate 17 which provides the structure with rigidity and balancing mass, as well as serving to mount an adjusting screw 18. A second adjusting screw 21 is screwed into the side of one of the plates 16. The plates 16 and 17 and screws 18 and 21 together constitute balancing means for the vessel 14. The plates 16 are also joined together beneath the trunnions 15 by an interconnecting block 19 which is secured to the upper end of a shaft 20. Further screws 22 support a projection 23 which carries a screw 24 that bears against the under side of the vessel 14 to position it.

The vessel 14 consists of two portions, a main horizontal cylindrical chamber 25 terminating at its outer end in a valve 26 held normally closed by spring 27 and a vertically extending generally cylindrical chamber 28 which forms an intercommunicating continuation of the chamber 25 and extends upwardly therefrom with its main axis coaxial with that of the shaft 20. This second chamber 28 is closed by a closure device 29 consisting of a rubber sealing ring 30 which is pressed outwardly against the upper walls of the chamber 28 by a V-groove formed between members 31 and 32 which are urged together by spring 33. The closure device 29 closes off the top of the vessel 14 so that no liquid can escape while the device is rotating. The closure device is preferably made of light metal like aluminum so that any shift of it from side to side, due to lack of a perfect fit, will not cause too large an error in the readings. For the same reason it should be symmetrical about its axis so that any turning about its axis will not cause any unbalance. It is desirable to drill a small hole 32' through the axis of the member 32 to let air in and out when the closure device is taken off or put on.

At its upper end near its connection to the block 19, the shaft 20 is mounted in a metal bush 34 (see also FIGURE 3) that is supported by a series of springs 35 within a housing 36 secured to the base plate 10. In the example illustrated, coil springs 35 have been employed, but other resilient connections such as leaf springs can be employed. For example, three flat phosphor bronze or beryllium bronze leaves, fastened to the outer surface of the bush and the inner surface of the housing so that they are tangential to both such surfaces and all extend around the bearing in the same sense, have been found quite satisfactory. A flexible diaphragm 37 connects the lower end of the bush 34 to the plate 10 to discourage inflow of air upwardly into the interior of the enclosure formed by the base plate 10 and cover 11, 12 and 13.

FIGURE 1b shows the downward extension of the shaft 20 which is mounted in a bush 38 supported in a cavity at the end of a fixed arm 39 projecting from a frame structure 40 which also supports the plate 10, such bush 38 being mounted on a resilient O-ring 41 and being further maintained in position by a second O-ring 42 disposed in a groove 43 formed in the periphery of the bush 38. This method of mounting facilitates transverse movement of the upper part of the shaft 20. A machined projection 44 on the shaft 20 bears on the upper surface of the bush 38 to provide vertical support for the shaft 20 and hence the other parts that the shaft supports within the enclosure formed by parts 10 to 13. A flexible drive 45 of generally conventional design, but preferably having somewhat greater flexibility than is usual, connects the shaft 20 with a coaxial shaft 46 which is driven by motor 47, the flexible coupling 45 serving to isolate as far as possible the shaft 20 from vibrations set up by the motor 47. The motor is supported on resilient mounts 48 on frame structure 40.

Referring again to FIGURE 1a, the plate 10 will be seen to include a pair of flap closures 52 and 53 which leads from the interior of the enclosure 10 to 13 to a waste chute 54. A fixed splash plate 55 and a hinged flap plate 56, that normally lies beneath flap closures 52 and 53 and springs up when these are raised, cooperate with flap closures 52 and 53 to act as upward extension of chute 54. FIG. 2 shows parts 52, 53 and 56 in raised position for discharging the vessel 14; FIG. 1a shows them in lowered position for operation of the device. A conventional temperature regulating device 57 is provided on the base plate 10 to control the temperature within the enclosure. This temperature must be regulated within 0.2° C., if the greater accuracy of measurement discussed above is to be achieved. The sample should be similarly temperature controlled prior to insertion in the vessel 14.

Secured to the bush 34 is a feeler rod 58 which passes freely through an aperture 59 in the housing 36 and extends to an aperture in the cylindrical wall 11 at which point it is supported by a rubber diaphragm 60 which serves both to support the rod 58 with freedom of longitudinal movement and also to minimize flow of air into or out of the enclosure, to avoid interference with the close temperature control. A coil 61 is mounted on the end of the rod 58 so as to surround the free end of one leg 62 of a permanent magnet 63. Longitudinal oscillation of the rod 58 will cause the coil 61 to cross magnetic lines of force extending between the two legs of the magnet 63 and thus generate a signal in the coil 61, which signal is fed via leads 64 to a detector shown diagrammatically by the block 65 and consisting of an amplifier and a suitable signal-amplitude indicating and/or recording instrument.

The device is initially calibrated by filling the vessel 14 with a reference liquid, say pure water. The motor 47 is then driven at a substantially constant speed and the rotating mass is balanced by means of adjusting screws 18 and 21, that is the centre of gravity of the system is caused to lie on the axis of rotation of the shaft 20. The closure device 29 is then removed and the reference liquid drained from the vessel. This is accomplished by raising the flap closures 52, 53 and 56, as shown in FIGURE 2, and tilting the vessel 14 about the trunions 15 in an anticlockwise direction through an angle of about 120°, so that all the liquid flows into the waste pipe 54. The vessel is then ready to be recharged with a sample liquid the density of which is to be compared with that of the reference liquid. Such sample is inserted into the vessel 14 and the closure device 29 replaced. Again the shaft is rotated. Due to the difference between the density of the sample and the reference liquid the system will now be out of balance. Such out-of-balance will give rise to an oscillation of the shaft 20. One component of this oscillation will be communicated as a longitudinal movement of the rod 58 and hence will generate a corresponding signal in the coil 61 which will be detected by the detector 65. The amplitude of this signal will be a measure of the density of the sample liquid.

For a discussion of the nature of the out-of-balance produced by rotating the device with the vessel filled with liquids of different density, reference should be made to FIGURE 4 which shows $x$ and $y$ axes intersecting at origin O which is taken to represent the axis of the shaft 20 (and thus of the bush 34) with the system at rest. This origin is thus the centre of the system. With the device being rotated at a constant speed, at any chosen time $t$, the axis of the shaft at the bush 34 under out-of-balance conditions is assumed to lie instantaneously at point B, a distance A from the origin O. For convenience FIGURE 4 is taken to represent the conditions in a horizontal plane passing through the longitudinal axis of the rod 58. The same diagram will be obtained for any horizontal plane in the enclosure, with a proportionality factor applied to the dimensions. The point C, which represents the centre of gravity of the system, is thus actually the projection of such centre of gravity downwardly to the plane of FIGURE 4. The point C will not lie on the axis of the shaft B under out-of-balance conditions but will lie a distance $a$ from point B, the line joining points B and C making an angle $\theta$ with the $x$ axis. The magnitude of $a$ is a measure of the degree of out-of-balance and thus the density. It is therefore this value which it is desired to ascertain.

It can be shown that the equations of motion for the point B for steady state conditions are $$m(A\omega^2 \sin \omega t + a\omega^2 \cos \theta) = KA \sin \omega t + RA \omega \cos \omega t$$
$$m(A\omega^2 \cos \omega t + a\omega^2 \sin \theta) = KA \cos \omega t - RA \omega \sin \omega t$$

where:
A is the distance between O and B and hence the amplitude of oscillation transmitted by rod 58;
$m$ is approximately equal to the mass of the rotating parts above the bush 34;
$\omega$ is the angular velocity;
$t$ is the instantaneous time;
K is the overall spring constant, i.e. the restoring force when the shaft 20 is pulled unit distance away from its normal rest position; and
R is a viscous resistance constant.

The solution of these equations gives the following value for the amplitude A:

$$A = \frac{ma\omega}{\left[R^2 + \left(\frac{K}{\omega} - m\omega\right)^2\right]^{1/2}}$$

This equation is plotted in FIGURE 5 for values of the parameters that have been used experimentally, the *x* axis indicating ω in terms of revolutions per minute and the *y* axis indicating A, the amplitude, in centimeters×10⁻³ for a chosen value of *a* of approximately 0.004 centimeter. It will be noted that the curve shows a pronounced peak at a value of about 900 revolutions per minute. The position of this peak can be arbitrarily chosen by suitable selection of the constants *m* and K. Conveniently, the spring constant K is the constant most easily adjusted, as it is determined principally by the stiffness of the springs 35 (or other type of springs used) with possibly a correction for the stiffness, if any, of the diaphragm 37. When it is convenient to use a synchronous motor which will have a constant speed, the selection of the springs 35 will be such as to position the peak of the curve in FIGURE 5 at the speed at which the shaft is turning. Maximum sensitivity is achieved by this means, since at the peak of the curve the maximum ratio between A and *a* is obtained. Since A is the function actually measured, while *a* is the function the value of which is to be determined, a high value for the ratio of A to *a* provides high sensitivity. Not only the position, but also the height of the peak of the curve can be controlled by selection of the constants.

On the other hand, in the region of the peak of the curve the system is also highly sensitive to variation of motor speed, so that if an induction motor is used, or the motor cannot be relied upon to turn the system at constant speed for some other reason, it is preferable to adjust the constants to operate on a flat part of the curve. Fluctuations in motor speed will then not appear noticeably in the results. This can be achieved either by changing the actual speed employed or by shifting the peak of the curve away from the chosen speed by using a different spring constant K.

In the above description of the use of the device, it has been assumed that it is initially balanced for a reference liquid. This is the preferred method of operation, but is not an essential feature. If desired, the system need not be balanced at any time, the comparison between each sample and a reference liquid comprising simply the comparison between two amplitudes of oscillation. In either case, the scale for translating the measurements taken, into density readings, will be an arbitrary one obtained initially as a result of a series of measurements taken on liquids having known densities. In constructing this scale it will normally be convenient to make zero amplitude of oscillation correspond to a density of unity, although it will be quite apparent that this selection may be varied at will. The same scale will be usable with all homogeneous liquids, but a separate scale will have to be constructed for each particular type of inhomogeneous suspension, because of the effect on the centre of gravity of solid matter that will settle out at the end of the vessel 14.

In the apparatus illustrated a dynamic pickup has been used. Alternatively a conventional crystal pickup could be employed. It may often be desirable to avoid interference from high or low frequency noise or from harmonics by providing the amplifier in the detector 65 with an electrical filter operating at the frequency of rotation. When operating at the peak of the curve, this fact itself has the effect of filtering out extraneous frequencies.

The flexible coupling 45 has been provided to avoid as far as possible extraneous sources of vibration. If found necessary, the whole unit may be isolated from the floor, if the latter is subject to appreciable vibrations.

Alternatively, the amplitude of oscillation may be measured by any other known technique, such as optical observation and recording, or electrostatically (making an element connected to the bush 34 one of the plates of a capacitor). As a further alternative, if a leaf spring support for the bush 34 were used, a strain gauge attached to one of such springs would indicate the amplitude of oscillation.

FIGURE 6 demonstrates the effect of failure completely to fill the vessel 14. This diagram shows a fragment of such vessel illustrating principally the vertical chamber 28. One of the difficulties in prior methods of density measurement has been the determination of an exact volume, and one of the important advantages of the present apparatus is its comparative insensitivity to volume. Let it be assumed that the vessel 14 is not completely filled with the sample liquid. When the device is rotated the air remaining in the vessel will become concentrated around the axis of rotation and will take the form of a paraboloid as shown at P in FIGURE 6. Reference letter Q in FIGURE 6 illustrates a similar paraboloid for a somewhat larger volume of air. Paraboloid P shows a volume of four cubic centimeters while paraboloid Q illustrates a volume of eight cubic centimeters, the entire volume of the vessel 14 being approximately five hundred cubic centimeters. It is noteworthy that in neither case is the balance of the system upset by the presence of air in the vessel 14 because the paraboloid of air is disposed symmetrical about the axis of rotation. This symmetry requires that the under surface of the member 32 of the closure device 29 should lie in a plane perpendicular to the axis of rotation and that the shaft 20 is vertical or approximately vertical.

This insensitivity of volume changes applies until there is so much air in the vessel that the paraboloid touches a side or the bottom of the vessel. Normally there is no difficulty in ensuring that the quantity of air remaining within the vessel is less than this critical amount. Note that it is unnecessary for the chamber 28 to be symmetrical about the axis of rotation provided it surrounds such axis and provides sufficient space for the air paraboloid to form without touching the sides of the vessel.

Positioning of the shaft 20 vertically is preferable as providing the maximum insensitivity to volume changes, but, if some sacrifice in this regard can be tolerated, rotation about a horizontal axis is possible, since the centrifugal forces are great in comparison with gravity.

When the sample being measured is a homogeneous liquid such as oil, the volume error produced by the presence of a paraboloid of air P or Q is entirely immaterial and has no effect whatsoever on the measurement. If the liquid is inhomogeneous, the suspended matter may settle at the extreme end of the vessel, the effect of which will be to increase the distance between the centre of gravity of the system and the axis of rotation, as noted above in connection with the calibration of a scale. Furthermore, a change in the volume of liquid will also change the amount of suspended matter settling and will therefore cause an error which is approximately directly proportional to the volume error. Thus, under these conditions, the volume of air remaining in the vessel 14 should be minimized as far as possible, but the system is still comparatively insensitive to such errors. The measurement obtained may also be subject to some error if an appreciable volume of air remains suspended in the liquid in the form of bubbles. Because of the large centrifugal forces acting on the liquid, however, the force urging the air to come to the centre is great and, once at the centre, the bubbles will effectively form part of the comparatively harmless paraboloid of air even if they do not break but remain at the interface between the liquid and air. In the case of inhomogeneous suspension such as pulp fibre, the small air bubbles may adhere to the fibre particles and continue to settle with them. In this case, the error will still be small because such bubbles will be subjected to such a high pressure that they will mostly be forced back into solution.

The valve 26 is provided in order to permit flushing between samples. For this purpose a spray will be forced through the valve 26 from an externally applied hose to flush the inner walls of the vessel 14 in preparation for the next sample. When dealing with homogeneous liquids flushing is not usually necessary and the valve 26 may even be omitted.

In a device designed for the measurement of the density of a highly viscous liquid, the volume of the vessel 14 may conveniently be increased from the 500 cubic centimeters adopted in the present case. This is done in order to minimize any error due to quantities of the liquid of previous samples clinging to the walls of the vessel.

We claim:

1. A densimeter comprising an assembly including a vessel for containing a liquid sample; means for continuously rotating said assembly about an axis of rotation, said vessel being asymmetrically disposed with respect to said axis; means resiliently mounting said assembly with freedom of oscillation transverse to said axis; and means for measuring the amplitude of any such oscillation.

2. A densimeter as claimed in claim 1, wherein said vessel comprises two intercommunicating hollow portions, one such portion being displaced from said axis and the other such portion surrounding said axis.

3. A densimeter comprising a shaft; means for continuously rotating said shaft; means resiliently mounting said shaft with freedom of oscillation transverse to its axis of rotation; means for measuring the amplitude of any such oscillation; and a vessel for containing a liquid sample connected to said shaft to rotate therewith, said vessel being asymmetrically disposed with respect to said axis.

4. A densimeter as claimed in claim 3, including balancing means for at least in part compensating for such asymmetry and for controlling the position of the centre of gravity of the assembly constituted by said vessel and said balancing means to enable said centre of gravity to be made coincident with said axis.

5. A densimeter as claimed in claim 4, wherein said vessel comprises two intercommunicating hollow portions, one such portion being displaced from said axis and the other such portion surrounding said axis.

6. A densimeter comprising a temperature controlled enclosure; a vertically extending shaft entering said enclosure; an assembly of elements disposed within said enclosure and connected to said shaft to rotate therewith, said assembly comprising a closable vessel for containing a liquid sample and balancing means, said vessel having a first hollow portion substantially symmetrically surrounding the axis of rotation of said shaft and a second hollow portion communicating with said first portion and extending generally horizontally away from said first portion so as to be disposed asymmetrically with respect to said axis, said balancing means being connected to said vessel and so disposed in relation to said axis as to compensate at least in part for such asymmetry whereby to control the position of the centre of gravity of said assembly as a whole and enable said centre of gravity to be made coincident with said axis; means mounting said shaft with freedom of oscillation transverse to said axis; and means for measuring the amplitude of any such oscillation.

7. A densimeter as claimed in claim 6, wherein said vessel is pivotally mounted on said balancing means to be movable between an operative position in which said first portion of the vessel extends vertically upwardly from said second portion to an open end normally closed by a closure device, and said second portion extends generally horizontally, and an emptying position in which said first portion extends downwardly away from said second portion, the latter extending upwardly from said first portion whereby both said portions can drain upon removal of said closure device.

References Cited in the file of this patent

UNITED STATES PATENTS

| 2,211,779 | Holmes | Aug. 20, 1940 |
| 2,403,554 | Ruda | July 9, 1946 |
| 2,615,328 | Dolza | Oct. 28, 1952 |
| 2,664,742 | MacDonald | Jan. 5, 1954 |
| 2,936,608 | Mott | May 17, 1960 |

FOREIGN PATENTS

| 752,356 | Great Britain | July 11, 1956 |